Oct. 21, 1969   SHIRO OKAMURA   3,473,872
CAMERA DEVICE UTILIZING A FAN-LIKE ARRAY OF OPTICAL FIBERS
Filed Jan. 19, 1965   15 Sheets-Sheet 1
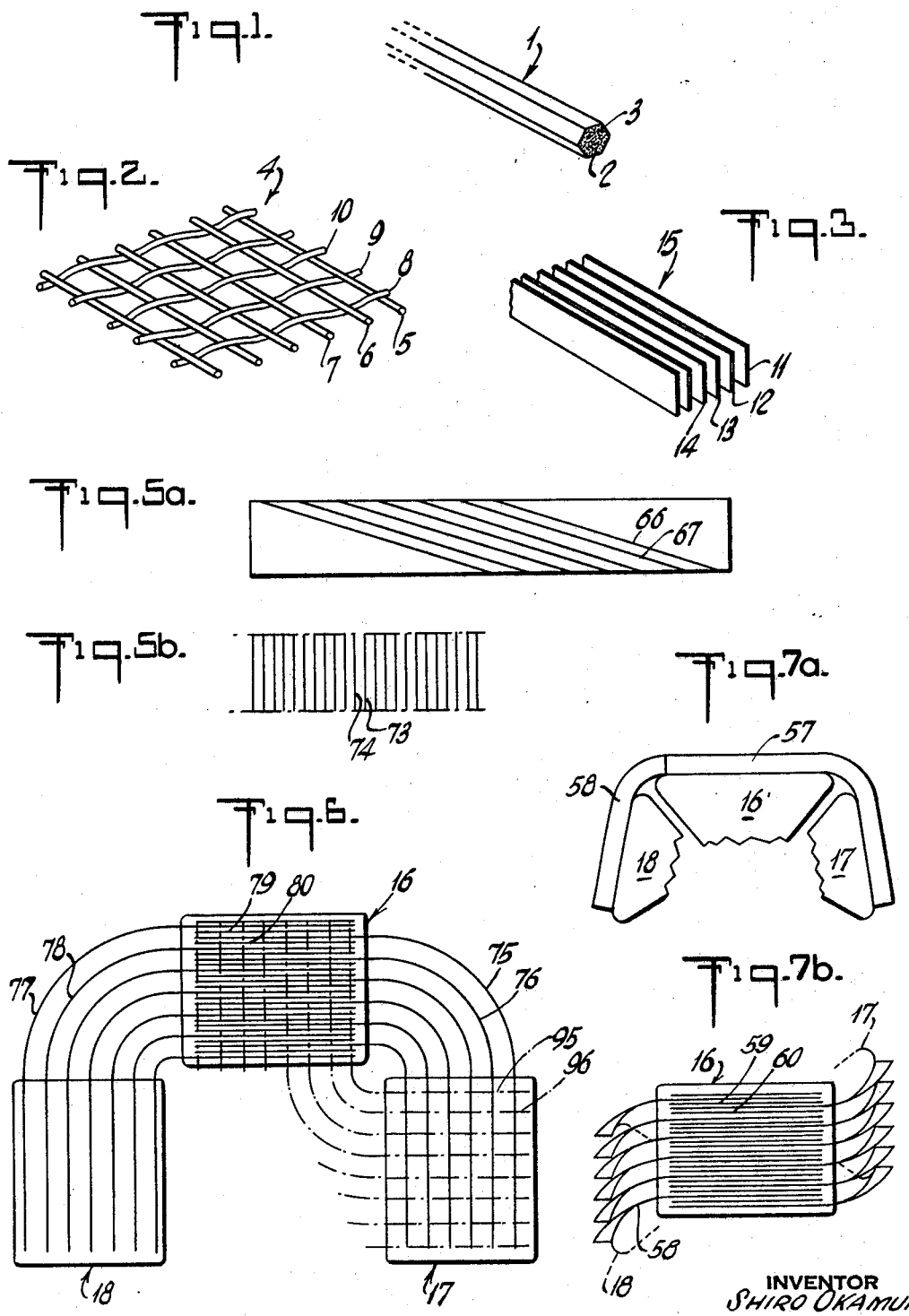
INVENTOR
SHIRO OKAMURA
BY
Hopgood & Calimafde
ATTORNEYS

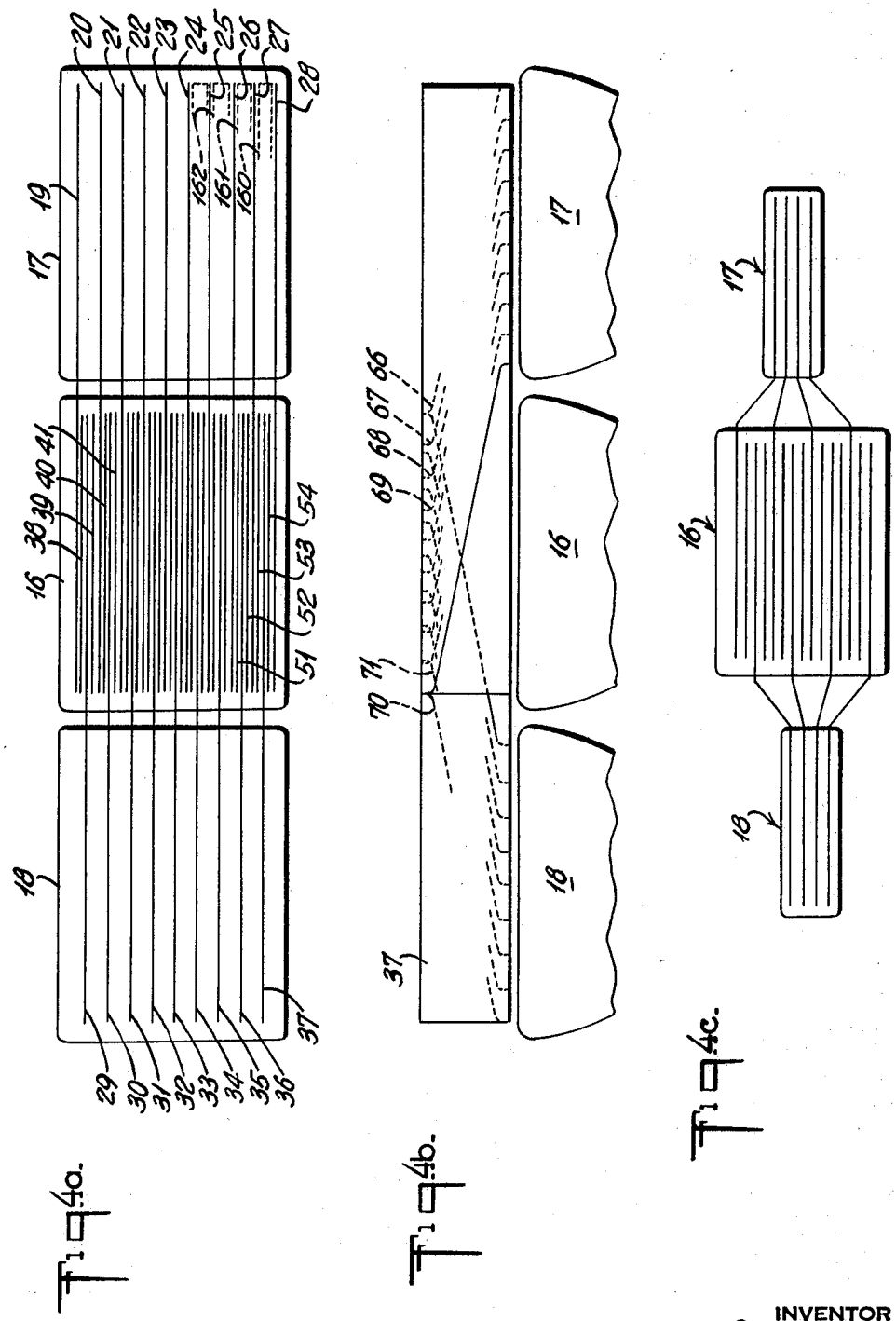

Oct. 21, 1969  SHIRO OKAMURA  3,473,872
CAMERA DEVICE UTILIZING A FAN-LIKE ARRAY OF OPTICAL FIBERS
Filed Jan. 19, 1965  15 Sheets-Sheet 3
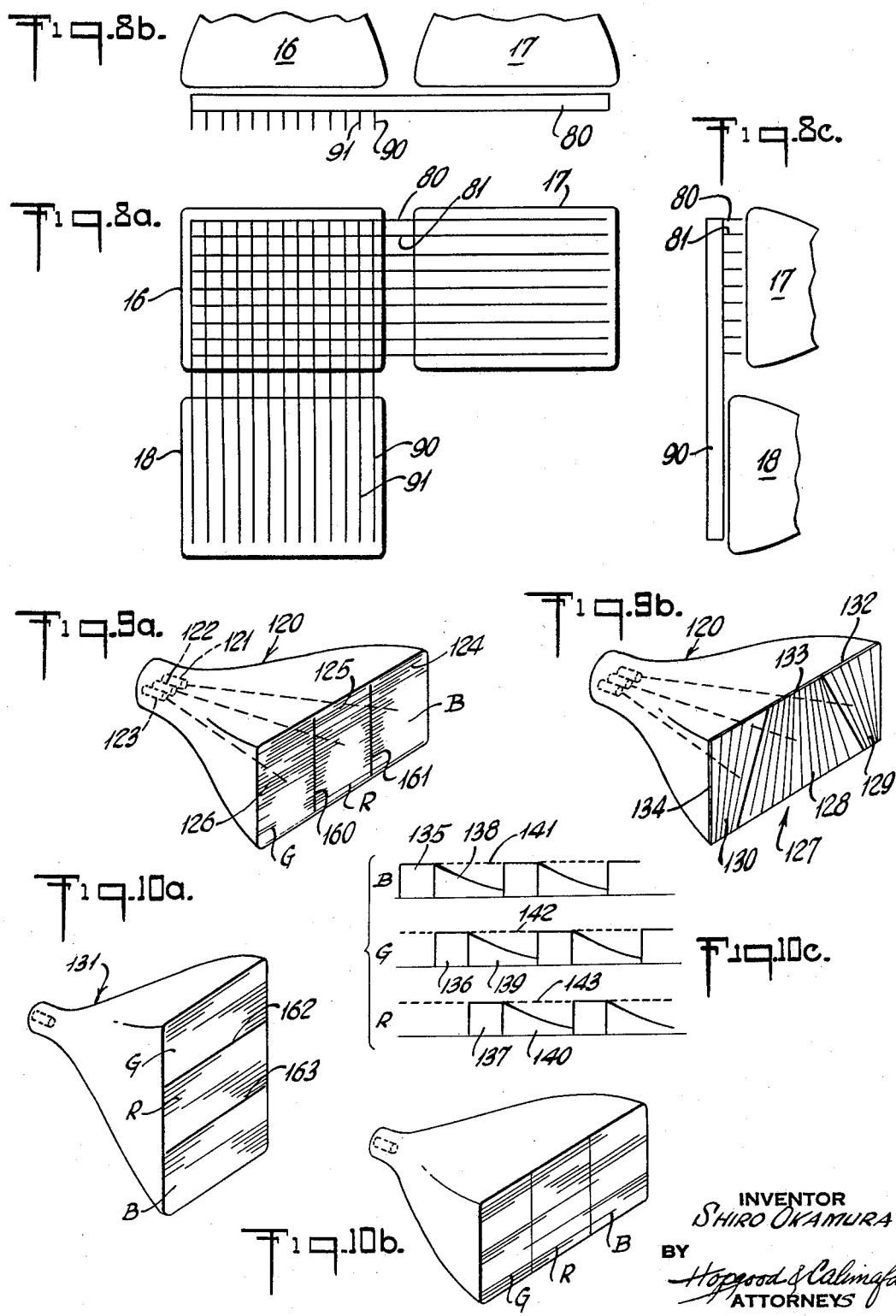
INVENTOR
SHIRO OKAMURA
BY
Hopgood & Calimafde
ATTORNEYS Oct. 21, 1969 SHIRO OKAMURA 3,473,872
CAMERA DEVICE UTILIZING A FAN-LIKE ARRAY OF OPTICAL FIBERS
Filed Jan. 19, 1965 15 Sheets-Sheet 4
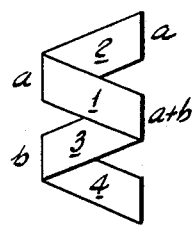
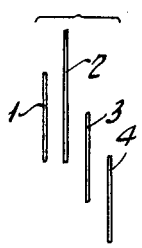
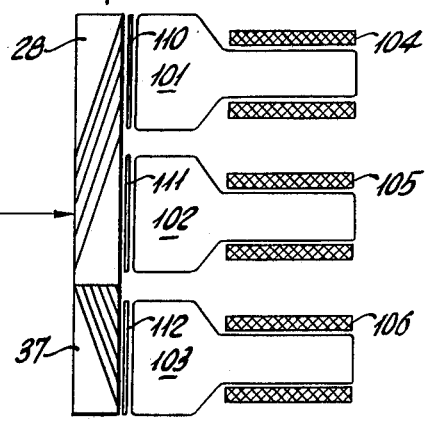
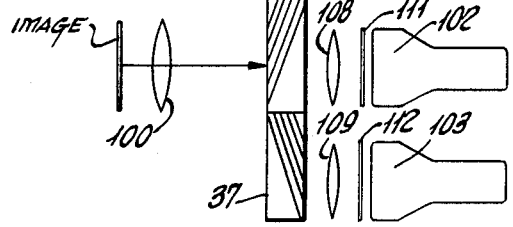
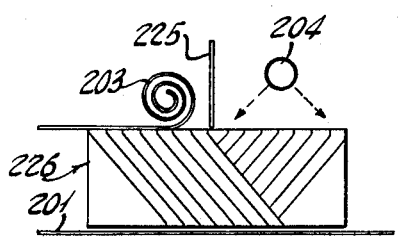
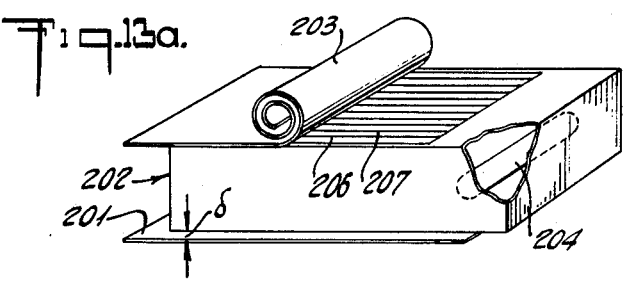
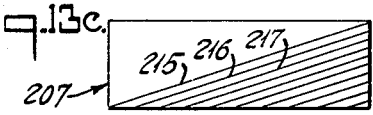
INVENTOR
SHIRO OKAMURA
BY
Hopgood & Calimafde
ATTORNEYS

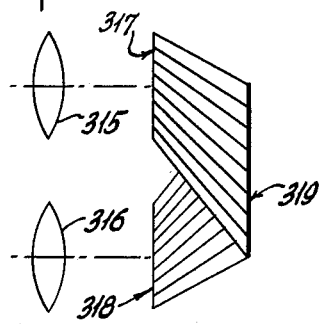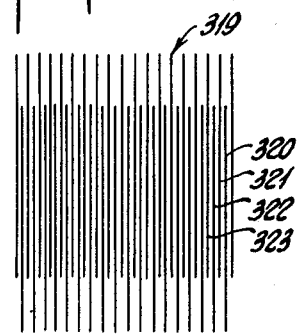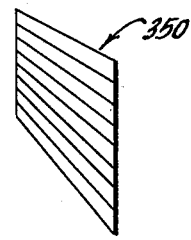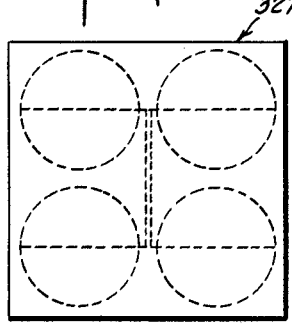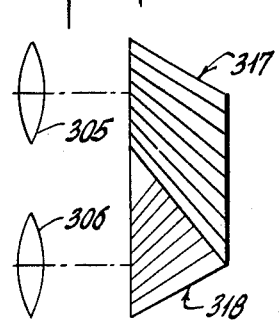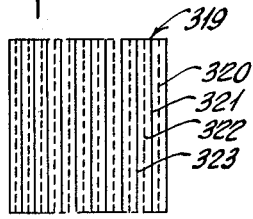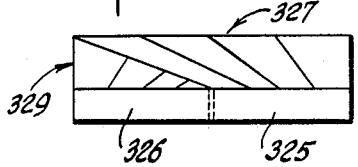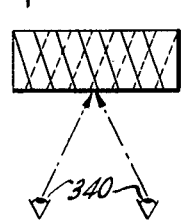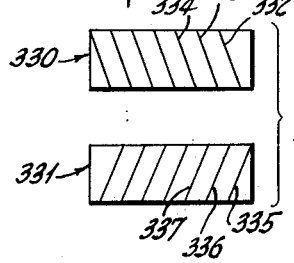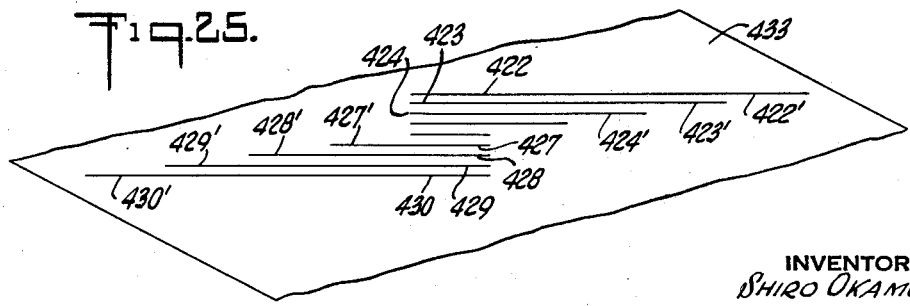

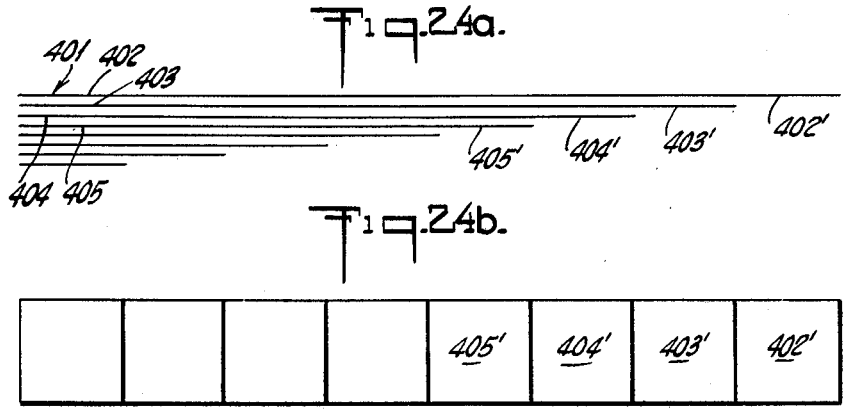
Fig. 24a.
Fig. 24b.
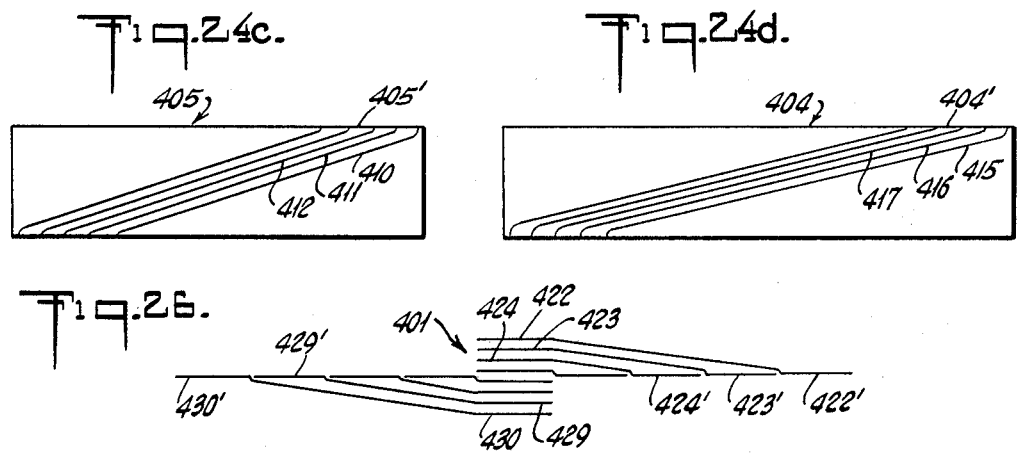
Fig. 24c.
Fig. 24d.
Fig. 26.
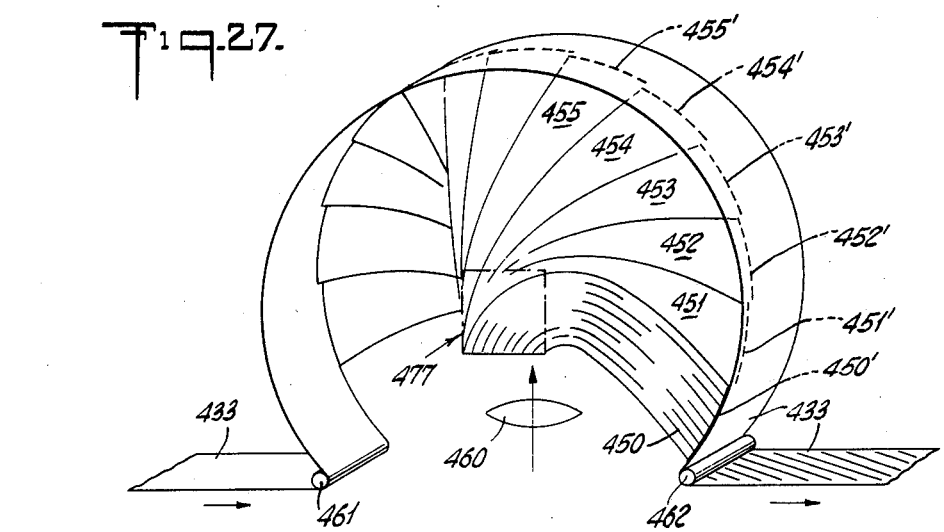
Fig. 27.

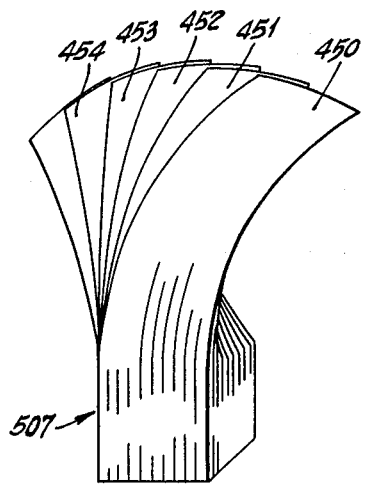
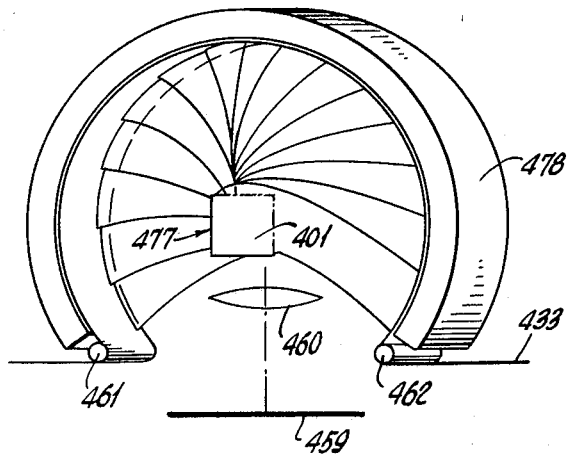
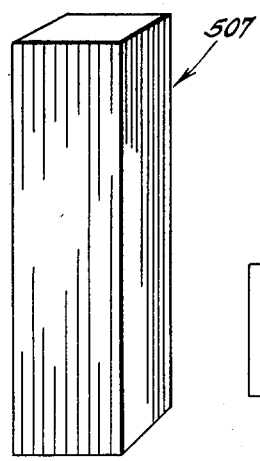
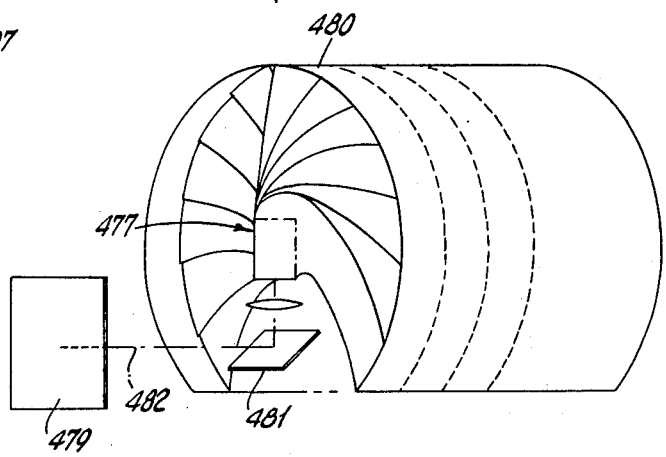

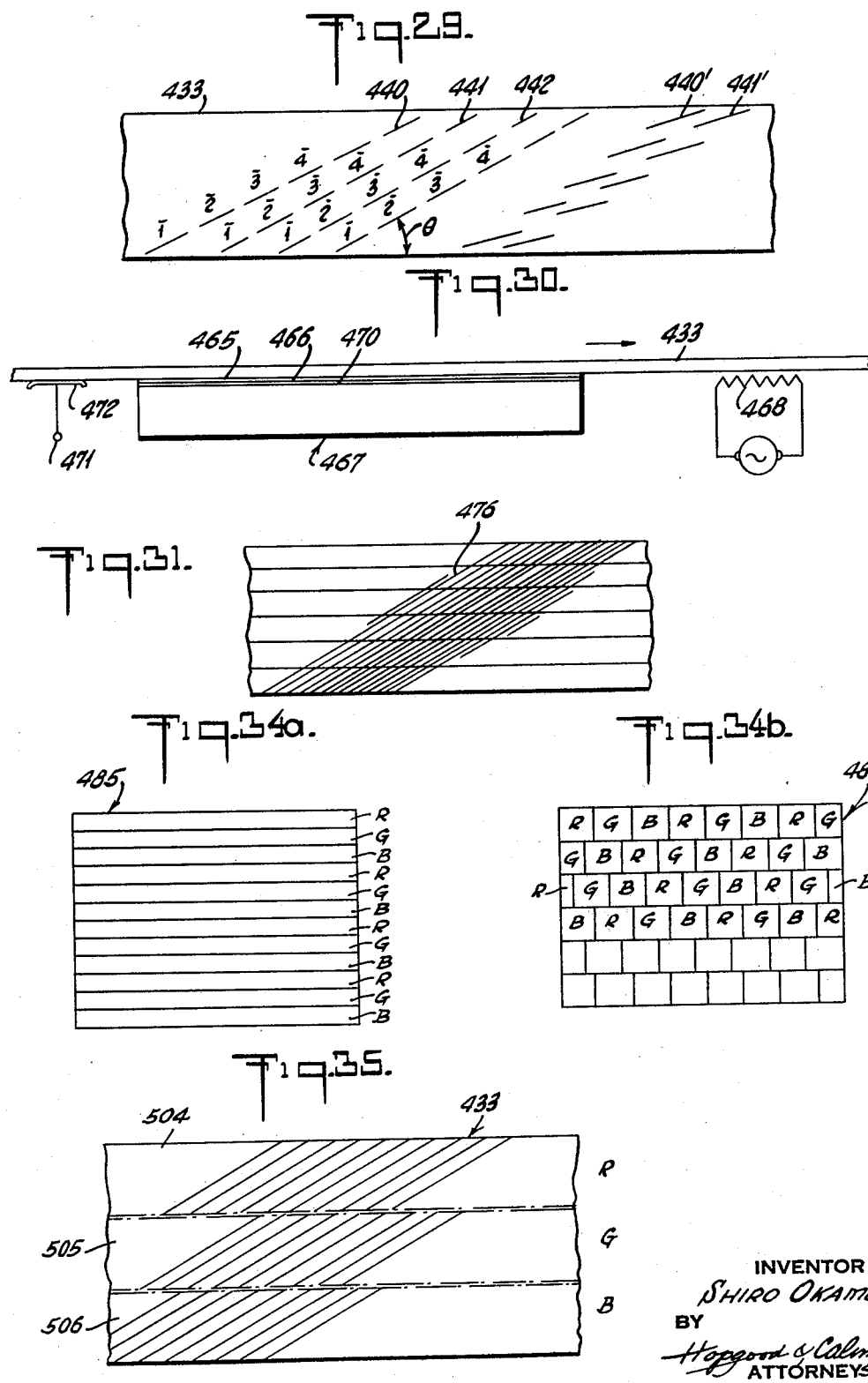

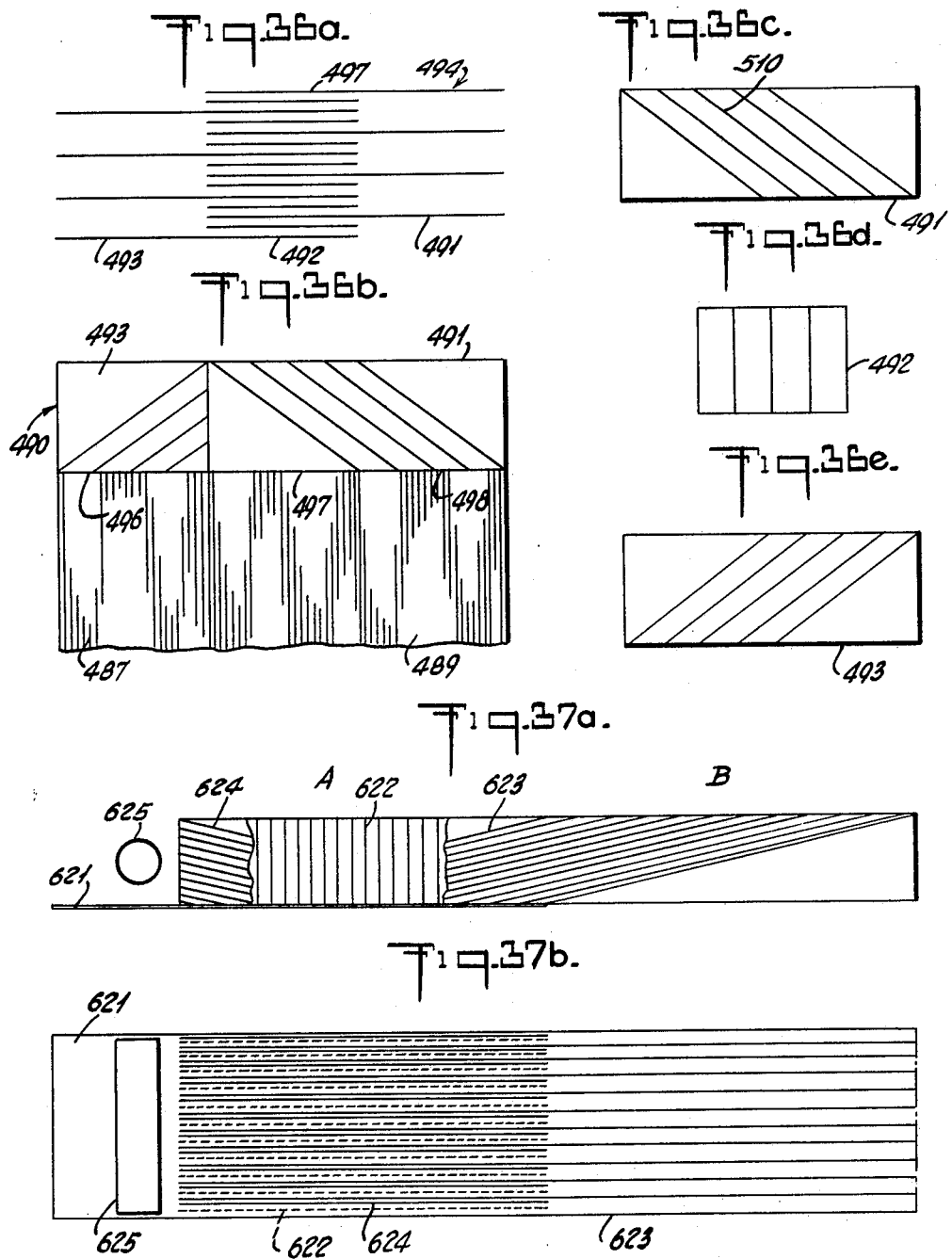

Oct. 21, 1969  SHIRO OKAMURA  3,473,872
CAMERA DEVICE UTILIZING A FAN-LIKE ARRAY OF OPTICAL FIBERS
Filed Jan. 19, 1965  15 Sheets-Sheet 13

INVENTOR
SHIRO OKAMURA
BY
Hopgood & Calimafde
ATTORNEYS

Oct. 21, 1969  SHIRO OKAMURA  3,473,872
CAMERA DEVICE UTILIZING A FAN-LIKE ARRAY OF OPTICAL FIBERS
Filed Jan. 19, 1965  15 Sheets-Sheet 14
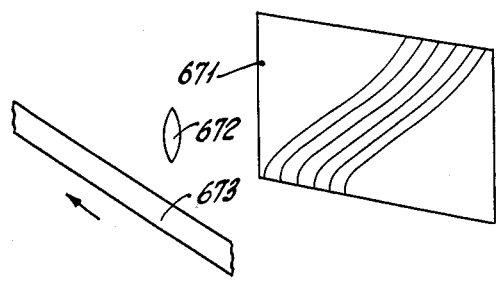
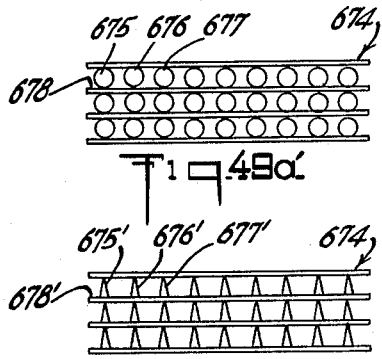
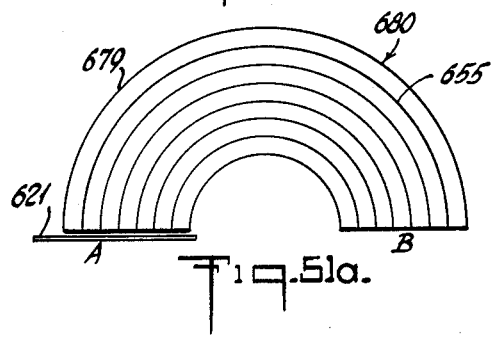
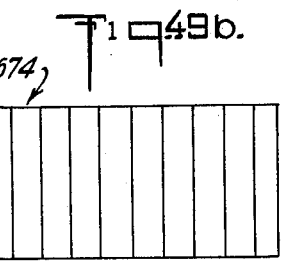
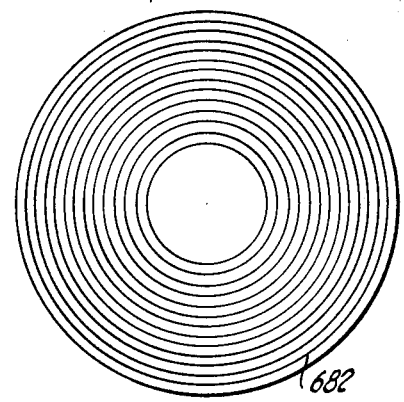
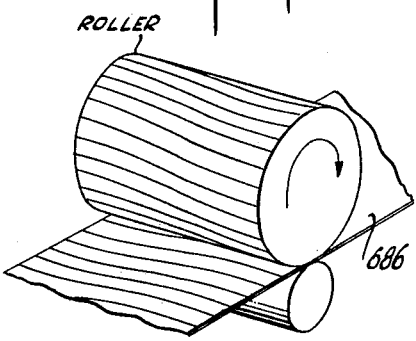
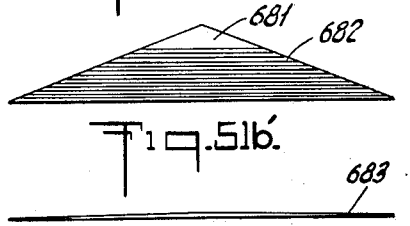
INVENTOR
SHIRO OKAMURA
BY
Hopgood & Calimafde
ATTORNEYS

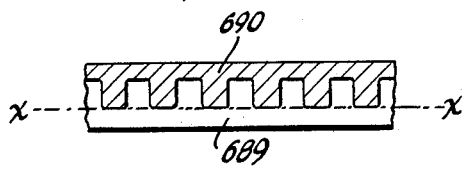
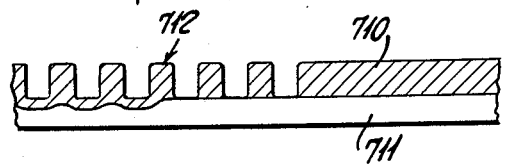
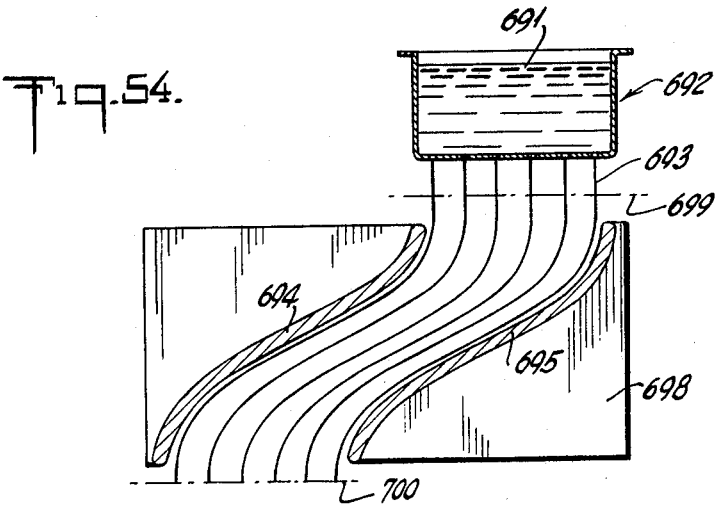
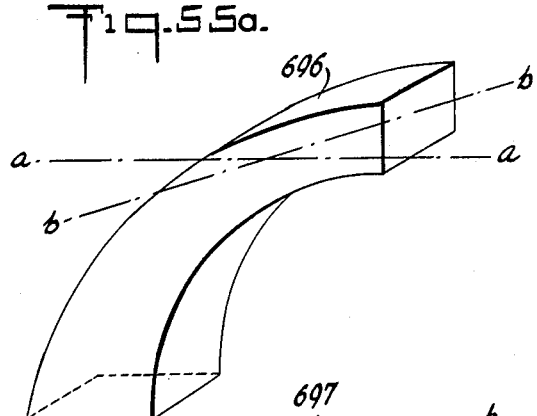
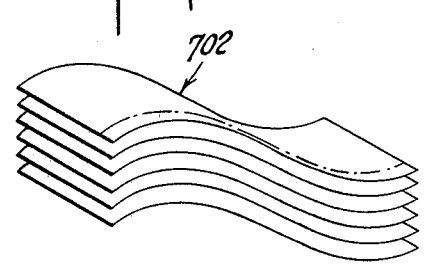
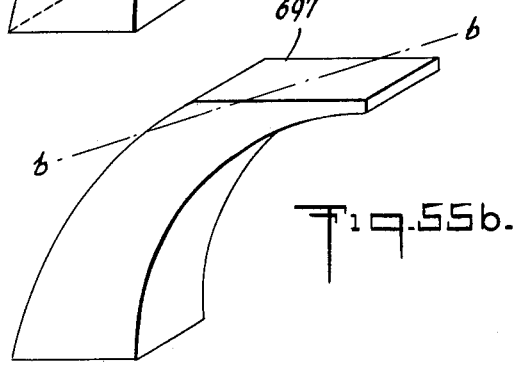

United States Patent Office 3,473,872
Patented Oct. 21, 1969

3,473,872
CAMERA DEVICE UTILIZING A FAN-LIKE ARRAY OF OPTICAL FIBERS
Shiro Okamura, 26, 2-chome, Shiroganedaimachi, Shiba, Minato-ku, Tokyo, Japan
Filed Jan. 19, 1965, Ser. No. 426,571
Claims priority, application Japan, Jan. 29, 1964, 39/4,122; Feb. 28, 1964, 39/10,885, 39/10,886, 39/10,889; Apr. 21, 1964, 39/22,284
Int. Cl. G02b 5/14
U.S. Cl. 355—1                          1 Claim

ABSTRACT OF THE DISCLOSURE

A device is described for providing an unusual optical recording scheme for a moving object. Discrete area portions of an image of an object are transposed along a line by means of a fibre optic bundle. The fibres are rearranged along a line to illuminate a recording medium such as photographic film which may record a moving object with uninterrupted motion of the film. On playback, the film with the many closely spaced lines is passed by the line of fibre optics which rearrange the recording information in a two-dimensional pattern. The only criterion for the speed of the film during recording is its sensitivity. Motion of the object relative to the film may be recorded with continuous moving film without the interrupted motion of conventional film cameras. Methods for making fibre optic bundles are described.

---

This invention relates to a device for establishing correspondence between optical patterns by utilizing optical fibers, for use in a colour television receiver, a colour television camera, a colour monitoring apparatus, a duplicator, a video tape recorder, a new motion-picture system, and other optical-image-converting devices.

Through use of optical fibers, or optical waveguides as called in this specification, proposals have been made to lead an optical pattern from a place to another, to magnify an optical pattern, to synthesize monochromatic television pictures into a coloured television picture, and to provide other optical fiberscopes. It has, however, been impossible to provide at a low cost an optical fiberscope of the kind. Furthermore, it has not been possible to utilize the optical waveguides in a duplicator, a video tape recorder, and the like.

An object of this invention is therefore to provide a device for establishing correspondence between optical patterns by utilizing optical waveguides, which has a very wide field of application as set forth at the outset of this specification.

Another object of this invention is to provide a device of the kind wherein optical waveguides may be assembled with ease in the desired manner.

As is widely known, an optical waveguide consists of a glass or other transparent fiber of from several microns to scores of microns in diameter, which is preferably coated with other material having smaller refractive index than the glass or the transparent material, and propagates the light incident onto one end of itself to the other and with very slight loss even when the same is bent with the radius of curvature being not less than a hundred times as great as the diameter thereof. As is also well-known, optical waveguides are in most cases used in a bundle whose overall cross-section may be rectangular, hexagonal, circular, or of any other desired shape. When the optical waveguides in a bundle are arranged in the regularly diverging manner, the bundle can transmit an optical pattern or image projected onto one end thereof, or displayed on a "port" thereof, to the other port to provide a magnified image.

According to the instant invention, such optical waveguides are arranged in side-by-side relation on a plane, in a twisted sheet-like manner, or generally on a two-dimensional extent to form an optical-waveguide group (or optical fibre sheet) with the ends of the optical waveguides forming the opposing edges of the two-dimensional extent. When the device of this invention is applied to a colour television receiver, similar optical-waveguide groups (or optical fibre sheets), or individual optical-waveguide groups forming a gross optical-waveguide group (or optical sheet assembly), are stacked on one another, with one of the above-mentioned opposing edges brought near to one of monochromatic pictures displayed on a picture tube to serve altogether as an input "port" for the picture and with the others of the opposing edges arranged on an area in intervening relation to like edges of another stack of individual optical-waveguide groups (or optical fiber sheets) whose opposing edges are brought near to another of the monochromatic picture. These and other intervening edges, if any, form altogether an output "port." In an application of this device to a duplicator, a gross optical-waveguide group (or optical sheet assembly) which is preferably composed of rectilinear optical waveguides is disposed between the image to be duplicated and a sensitized paper, with those of the above-mentioned opposing edges which are near to the image being arranged in intervening relation to the like edges of another gross optical-waveguide group (or optical sheet assembly) whose opposing edges being illuminated. The latter gross optical-waveguide group (or optical sheet assembly) may be replaced with a stack of transparent films or even dispensed with.

The invention will be described more in detail in conjunction with accompanied drawing in which:

FIG. 1 shows an example of a thread of optical fibre employed in this invention.

FIG. 2 shows an example of the optical fibre cloth according to the invention.

FIG. 3 shows another example of the optical fibre sheet according to the invention which is sliced from the lamination of optical films.

FIG. 4 shows schematic of an example of the color receiving apparatus according to the invention in plan (a), elevation (b) and in plan of a modified apparatus (c).

FIG. 5 shows two optical fibre sheets employed in the invention.

FIG. 6 shows schematic of another example of the color receiving apparatus according to the invention.

FIG. 7 shows still another example of the color receiving apparatus according to the invention in plan (a) and elevation (b).

FIG. 8 shows still another example of the color receiving apparatus according to the invention in plan (a), elevation (b) and side view (c).

FIG. 9 shows another embodiment of the invention applied to the color receiving tube in schematic (a), sideview (b) and illustrating diagram (c).

FIG. 10 shows still other embodiments of ones as shown in FIG. 9.

FIG. 11 shows an example of other pattern treatment apparatus (a, b) and the color television pick up apparatus (c) according to the invention.

FIG. 12 shows a modification of the apparatus shown in FIG. 9.

FIG. 13 shows an example of the pattern duplicator (a) and the optical sheets (b), (c) and (d) employed therein in rough sketch.

FIG. 14 shows another example of the pattern duplicator in elevation (a) and the optical sheets employed therein with (b) and (c).

FIG. 21 shows an example of optical apparatus according to the invention in elevation (a) and sideview (b) and the optical sheet employed therein.

FIG. 22 shows a modification of the apparatus shown in FIG. 19 in elevation (a) and plan (b).

FIG. 23 shows an example of the stereo-optical equipment according to the invention in elevation (a), sideview (b) and sketch of optical sheets utilized.

FIG. 24 shows the schematic of the pattern transforming recording system according to the invention in plan ((a)), elevation ((b)), and the optical sheets employed therein ((c) and (d)).

FIG. 25 shows an example of the pattern transformation.

FIG. 26 shows another example of the pattern transformation.

FIGS. 27 and 28 show an example of the pattern transforming recorder according to the invention in rough schematic and an example of the manner of the fabrication of the optical sheet element in (a) and (b).

FIG. 29 shows an example of the recorded pattern according to the invention.

FIG. 30 shows the schematic of another recording equipment according to the invention.

FIG. 31 shows another example of the recorded pattern according to the invention.

FIG. 32 shows another example of the recording apparatus according to the invention in rough sketch.

FIG. 33 shows an example of the recording or reproducing apparatus according to the invention.

FIG. 34 shows two examples of the color filter in color system of the invention.

FIG. 35 shows an example of the recorded pattern in color system of the invention.

FIG. 36 shows the assembly of the optical system in the color recording or reproducing system of the invention in plan ((a)) and elevation ((b)) and the sheets elements ((c), (d) and (e)).

FIG. 37 shows an example of the pattern resolving apparatus utilizing the optical sheet assembly according to the invention.

FIG. 48 shows another manufacturing method of the optical sheet.

FIG. 49 shows the construction of the optical sheet in different forms.

FIG. 50 shows a different form of the optical sheet and its application.

FIG. 51 shows the procedure of the fabrication of the optical element employed in the apparatus shown in FIG. 50 in plan ((a)), elevation ((b)) and the processed element ((c)).

FIG. 52 shows another method of fabrication of the optical sheet element according to the invention.

FIG. 53 shows still another fabrication method of the optical sheet.

FIG. 54 shows another method of the optical sheet.

FIG. 55 shows another method of fabrication of the optical sheet for special purpose.

FIG. 56 shows still another fabrication method of the optical sheet.

Figure 15A:
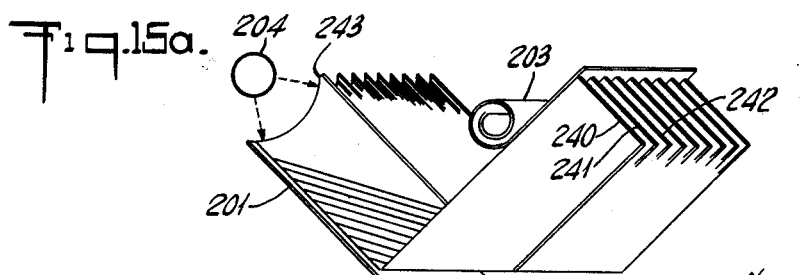
FIG. 15 shows still another example of the pattern duplicating apparatus according to the invention in rough sketch (a) and the optical sheets employed therein ((b) and (c)).

In FIG. 1 there is shown the well known light waveguide having hexagonal cross-section. Optical glass wire preferably coated with other material having lower refractive index is commonly used. The light wave propagates along the guide reflecting at the boundary with slight loss. Such guide may be assembled together to form a tube as is known. The diameter of the waveguide may be, say, several microns to several tens of microns. The light wave can propagate without increasing of loss when the guide is bent with radius of curvature larger than one hundred multiple of the diameter of the guide. The shape of the cross section of the guide may be rectangular, circular etc.

FIG. 2 shows schematically the light conducting cloth according to the invention woven from fibre of the light waveguide and wire or thread as warp and woof respectively. This construction can be utilized as the light waveguide sheet or optical sheet in the present invention.

FIG. 3 shows another example of the light waveguide sheet 15 composed of glass films 11, 12, 13 etc. laminated together with proper cement which is sliced from the laminated optical film having proper coating with lower refraction index.

FIG. 4 shows an example of color television receiver utilizing the light wave guide sheet according to the present invention. 16, 17 and 18 show the monochromatic picture tubes of the prior art which are applied, respectively, the green, blue and red video signals or other elementary color signals derived e.g. from the NTSC-system. The source of the color video signal may be any other system which enables the separation of the signals of original color signal such as the CBS system. The separated signals may be either simultaneous or sequential. In front of the tubes there are applied color filters corresponding to the signal applied. The color light pattern produced on the screen of each of the picture tube may be transported to the front of tube 16 line by line shown as 19, 20, 21, 22, etc. on the screen of the tube 17 and so on. Thus lines 29, 30, 31, etc. transport the pattern of tube 18 to the front of tube 16. The transported pattern produced from each picture tube is thus synthesized in front of the tube 16 as shown. The synthesized pattern is therefore composed of three patterns produced by the picture tubes 16, 17 and 18 comprising line sequential structure each line corresponding successively to each elementary line of the elementary pattern. The translation of the optical pattern is possible according to the invention by means of the sequential stacking of the "optical fibre sheet" 19, 20, 21 . . . ; 29, 30, 31 . . . and 38, 39, 40 . . . which are stacked alternately as shown corresponding respectively to the picture tubes 17, 18 and 16. The construction of the sheet is apparent from FIG. 4b or FIG. 5 with reference numeral 55 and 56. A plural number of optical fiber are arranged nearly parallelly each other and transmit the intensity of all the elementary spots of the patterns. The fibre may also be not parallel so as to vary the dimension of the pattern. The terminal part of the elementary fibre may be bent preferably as shown with numerals 70, 71 etc. so as effectively to gather the light on the pattern. Between sheets 29, 30, 31 . . . or 19, 20, 21 . . . there may be inserted spacers 160, 161, 162 . . . with light absorbing property. Alternatively the sheet in both sides may be compressed such as shown in FIG. 4(c) the original pattern 17 and 18 also being compressed. The optical sheet in front of the picture tube 16 may have a construction as shown in FIG. 5b. Alternatively optical sheets in front of tube 16 may be neglected while they only transmit directly the pattern of 16 though they may preferably be used because of parallax.

The synthesized pattern thus produced is therefore line sequential color pattern which has no parallaxes in the case of known system utilizing two half reflecting mirrors due to the thickness of the glass. In the case of such mirror system which is heretofore often tried to make a simple color receiver has the merit of its high luminosity and ease of adjustment which are demerits of NTSC three gun picture tube. However, its main demerit is the parallax with large aperture as is apparent from the concolor patterns should be strictly kept, so that the aperture of the presented picture is very small.

It only permits the one-man observation from a certain distance. It also suffers from the bulky size because of its mirror system. To the contrary the synthesis of three color patterns according to the invention has no demerit of parallax with large aperture as is apparent from the construction and has all the merit of the mirror system of high luminosity and ease of adjustment. The resolution may also be good because of the nature of the optical fiber attached to the face of picture tube. Approached observation is possible as the case of NTSC system.

The dimension of the apparatus is small compared with the mirror system because there is no reflecting space. The thickness of the sheet assembly may be one or two inches measured in front of the picture tube. All the troubles arised in the NTSC receiving tube such as the drift of convergence, very low luminosity, the expense for picture tube which is difficult to produce etc. are eliminated.

The elementary optical fiber utilized in the invention may have the diameter or width corresponding to the minimum phosphorescent spot on the screen of the picture tube. The dimension may be say, 0.004" to 0.04" as may be different by the dimension of the picture tube utilized and also by the color of that tube. Such dimension may be large compared with the optical fiber heretofore utilized. Therefore the fabrication of the fibre is easier compared to the usual case. It is rather unnecessary that the fibre is flexible. The elementary optical fibre may be arranged in one or more than one layers in a sheet form. The fabrication technique will be described later.

The number of sheets stacked together may be decided by the resolution of the picture. Thus for the case of U.S. standard it may be necessary about 500 sheets for one color. The sheets may coincide with the horizontal lines in case the sheets are arranged parallel to the horizontal lines. However, practically about 250 sheets may be enough for color reception.

The number of sheets may be different for the color, that is, for the red tube the resolution should be high and a more number of sheets is used, and for yellow and green and purple the number may be smaller. The direction of the sheet may also be perpendicular to the horizontal scanning or it may rather be oblique to the scanning direction. In this case the number of sheets may be arbitrarily chosen.

The optical sheet may be constructed with the optical cloth as shown in FIG. 2 or it may be composed of the sheet shown in FIG. 3.

The optical fibre sheet assembly according to the invention has thus the merit of easy mass-production, small size compared with the usual mirror system, no parallax and wide aperture etc. Many modifications are possible.

FIG. 6 shows another sheet assembly in which the sheets 75, 76 . . . and 77, 78 . . . are bended as shown. The sheets 95, 96 . . . as shown may also be used.

In FIG. 7 different sized picture tubes are used according to the color theory described above. That is, for the picture tube corresponding to yellow, green and blue the resolution signal and red signal. Tubes 17 and 18 may Therefore tubes 17 and 18 may be smaller than tube 16. Thus the tube 16 may correspond to monochromatic high resolution signal and red signal. Tubes 17 and 18 may correspond to other chominance signals. The formation of such signals may be performed by the known art from the Y, I and Q signals in the NTSC system. The patterns on the tubes 17 and 18 are translated by the curved optical sheets assembly 57 and 58 as shown.

This construction is feasible because of the flexibility of the optical fibre. The sheet assembly is shaped and preferably molded with plastics. The tubes 17 and 18 may be placed with their axis skewed each other as shown in FIG. 7b so as to make the apparatus compact. Such is also possible with the flexible optical sheet.

In FIG. 8 the optical sheets 80, 81 . . . attached to tube 17 are perpendicular to optical sheets 90, 91, . . . attached to tube 18 existing on the different plane. The image arising from the surface of tube 16 is viewed through gratings composed of these sheets assemblies. Optical sheets for tube 16 may also be employed. This construction enables a larger of sheets to be employed. However, some parallax may be inevitable.

The optical sheet according to the present invention may also be applicable to dichromatic system which enables fabrication of more compact color receiver. In this case optical sheets as shown in FIG. 5a only or sheets as shown both in FIGS. 5a and 5b may be utilized.

In FIG. 9 three picture tubes are combined in one three monochromatic tube in which three guns 121, 122 and 123 are arranged and produce rasters 124, 125 and 126 colored by filters 132, 133 and 134 corresponding respectively to e.g. blue, red and green. The separated chrominance signals as before are fed respectively to these guns. The optical sheet assembly 127 composed of the sheet elements 128, 129 and 130 in FIG. 9b synthesize these three color patterns as described formerly. The manner of the pattern arrangement may be arbitrary such as in the horizontal or vertical direction.

In FIG. 10a there is shown a usual monochromatic picture tube having a single gun. However, in this case three field sequential patterns are generated corresponding respectively to e.g. green, red and blue signals. This is performed by reducing the vertical frequency to one third of usual value and feeding the grid of the tube field sequential color signals processed e.g. from NTSC signal. This technique is well known in the CBS color disc-filter system in a manner that the separated chrominance signal is gated sequentially per field. Three color patterns via optical filter means or colored fibre means are synthesized as in the case of FIG. 9.

FIG. 10b shows a single gun monochromatic tube generating line sequential three field patterns corresponding to e.g. blue, red and green. In this case three patterns are arranged in the horizontal direction. The video signal fed to the grid of the gun is the line sequential color signal, that is, the horizontal frequency is reduced to a third of the usual value, and the separated chrominance signals are gated sequentially line by line.

In the case of FIG. 10a there may be flicker effect due to slow rate of the chrominance, however, this may be avoided by utilizing the phosphorescent screen having rather large afterglow effect. Alternatively a tube having construction of a kind of memory tube may preferably be used which may illuminate continuously and change its pattern every three field. Such situations may be seen in FIG. 10c.

The ordinate indicates the time elapsing and the abscissa indicates the intensity of the luminosity for respectively blue, green and red. For the gated period 135 the intensity is constant and it decays with time as shown with 138 if the screen with afterglow effect is employed. If a kind of memory tube is used the intensity does not decay as is shown by the dotted line 141.

In the case of FIG. 10a the synthesized picture may preferably be line interlaced by the proper placing of the respective fibre sheets so that the elementary color lines may not coincide one another. The boundary part 160 and 161 of the frame in FIG. 9 may be made of thick glass so as to make the thickness of the picture part as thin as possible in order to decrease the fall of the resolution due to glass thickness.

The pattern treating method according to the invention is not restricted to the above described, but it is useful to many other systems providing the transmission, resolving and synthesizing of optical pattern or patterns to other optical apparatus or organ or organs having any dimension or dimensions.

The number of input and output ports may be arbitrarily selected, e.g. it is possible to make correspondence between two input ports and three output ports, or, it is possible to make from three original patterns a, b, and c four possible combinations ab, bc, ca, abc and so on.

Also it is possible according to the invention to transform three dimensional object into two or one dimensional pattern. The pattern may be e.g. three dimensional at the input port and two dimensional at the output port.

FIGS. 11a and b show an example of the apparatus in front and side views respectively capable of establishing from two patterns a and b the treated patterns, a+b, a and b. Such a case may be useful for photomontage.

The optical sheet assembly itself may be made to form the face plate of the picture tube especially in the case of FIG. 9. In this case the end part of the assembly may be melted to make it airtight.

There examples of the application may be, color television camera, duplicator of optical pattern, photomontage, stereophotography, avionics and many other systems comprising the synthesis of plural number of patterns in the field of e.g. electromedics.

FIG. 11c shows an application of the present invention to the color television camera. The optical image produced by the focussing lense 100 is separated by the optical sheet assemblies 28 and 37 etc. to excite three pick up tubes 101, 102 and 103 corresponding for example, to red, green and blue colors respectively. 104, 105 and 106 show focussing and deflecting coil assemblies. 110, 111 and 112 show color filters produced, for example, by the vaporizing process. Instead of color filters, colored optical fibre may as well be used as in the case of color receiver apparatus described above.

According to this construction there is avoided the trouble of color registration in employing the dichroic mirror which comprises much difficulties in the prior system.

Also the space necessary for the optical system is reduced and more compact camera may be constructed.

There is no need of using anastigmatism compensator to compensate the aberration due to dichroic mirror. Therefore the pickup apparatus becomes very simple and compact.

The face of the pick up tube may be composed of the sheet assembly of airtight nature.

FIG. 12 shows the modification of the apparatus shown in FIG. 11. The separated patterns are again focussed by the focussing lenses 107, 108 and 109.

Plural number of pick up tubes may be placed in one housing so as to enable simple construction of simpler coil assemblies e.g. surrounding all tubes commonly. Such construction enables to make more compact-sized camera.

In one aspect of the present invention the technique of synthesizing of the pattern can be utilized for the formation of the interpolated pattern of original plural patterns. For example, from two sequential pictures of the television in the sequential form an interpolated picture can be obtained by the above technique shifting the horizontal lines, employing the assembly of the optical sheets properly interleaved together. Therefore frequency band compression is possible by transmitting slow downed picture each one per frame.

Also an intermediate picture can be derived from series of cartoon thus producing smooth motion of cartoon motion picture, or it is possible to economize the required number of pictures.

FIG. 13 shows one example of the pattern duplicator utilizing the optical sheet according to the invention. 201 is the pattern to be duplicated such as the page of a magazine. The prior art for duplicating such pattern having different patterns on both sides of the sheet was to take photography of the desired page or to attach a special photosensitive paper on that pattern and illuminate said paper from the back side, said paper being printed to positive paper afterwards.

Such procedures require expensive materials and generally cost high, the time and effort being also much.

According to the invention the pattern to be duplicated is illuminated directly by an assembly of optical sheet and also taken up by another assembly of optical sheet which directly exposes the photosensitive paper which may be ordinary, cheap blueprint paper. These two assemblies of optical sheets are laminated one after another. In FIG. 13a 202 shows such combination of assemblies in which 206 and 207 correspond respectively to one sheet of each assembly. The photosenstive paper 203 is attached onto the assembly 206. Examples of the elementary sheets may be seen in FIG. 13b and c in which the former (206) corresponds to the pattern translating sheet assembly and the latter (207) corresponds to illuminating sheet assembly. The fibre elements are shown by the numerals 210, 211, 212 . . . and 215, 216, 217. FIG. 11d shows a modification (208) of FIG. 13c in which the elementary optical fibre 20, 21, 22 . . . are bended as to effectively illuminate the pattern. 204 in FIG. 4d shows the light source. Two sorts of sheets are alternately laminated to form a photoduplicating sheet assembly as shown by numeral 202 in FIG. 11a.

In one aspect of the invention the illuminating sheet assembly may be neglected and the illuminating light may be projected from light source 270 obliquely onto the pattern through gaps of the optical sheets composing assembly 206. It is preferable to use shadow means in these gaps so as to avoid the reflected light to expose the photosensitive paper.

Alternatively the sheet 207 may be more transparent glass having black portion to avoid the exposing at its upper side facing the photosensitive paper.

In these cases the illuminating may be preferably perpendicular to the pattern by the orientation of the fibre elements at the terminals.

The assemblies for illumination and pattern transformation may be interchanged with each other. The fibre elements for the illumination may be more rough generally than for the pattern. For the purpose of effectively illuminating the pattern there may be small clearance δ between the lower surface of the fiber assembly and the pattern to be duplicated. This clearance may be provided by a thin transparent film. However, in usual case an inevitable clearance may be produced that may be enough therefor. In some cases the sheet 207 may be composed of optical fibres covered with light absorbing member so as to avoid any leakage of light to the photosensitive paper. In general case of employing usual light waveguide with perfect reflection at the guide wave surface there will be no necessity therefor. At the lower side of the sheet assembly two sheets 206 and 207 may interleave each other so as to effectively illuminate the pattern.

The thickness of the sheet, especially that for pattern translation, therefore the number of the sheet, and the diameter of the elementary fibre, therefore the number of the fibre in a sheet, should be decided by the required resolution of the duplicated pattern.

The photosensitive paper 203 will be exposed by the pattern having mirror image relation to the original pattern if the paper is put its photosensitive surface onto the sheet assembly. Printing from this negative paper will yield a positive pattern having correct relation. Instead of this a thin photosensitive paper may be used exposing the back side thereof. Alternatively the exposed thin paper may be observed from the back side.

The duplicated print obtained as described may be clear because of the light converging effect of the light waveguide and also very photosensitive by the same reason. Very cheap photosensitive paper such as the blueprint paper can be used compared with that heretofore used for taking the duplication from the surface.

The sheet 208 in FIG. 13d is curved at the light receiving surface so as effectively to gather the light from the source. The fibre may be bended as shown preferably.

The original pattern may of course be transparent and in this case the light source may be placed below the pattern.

In FIG. 14 the optical sheet assembly is somewhat different from that shown in FIG. 11. The light source 204 illuminates the sheet assembly from above side. The optical sheet is composed of sheet elements 227 and 228 shown in FIGS. 12b and c. The sheet may have nonparallel fibre assembly 230, 231 . . . or 233, 234 . . . as shown so as to enlarge or reduce the size of the pattern. In this manner the size may arbitrarily be altered upon duplication.

Figure 15B:
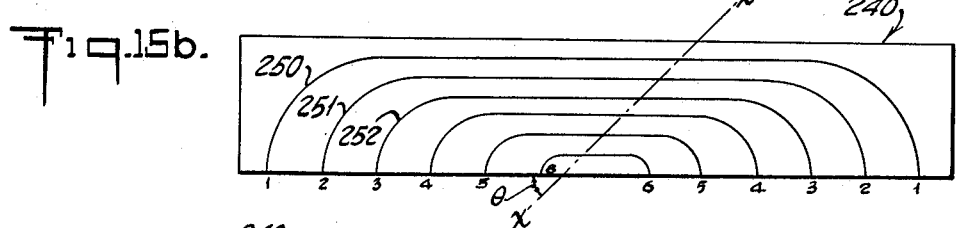
Figure 15C:
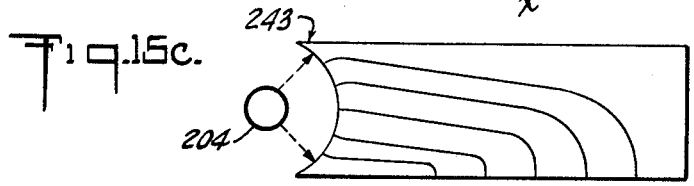

In FIG. 15a there is shown an example of the apparatus capable of pattern inversion so as to obtain a precise duplication directly from the mother copy. The sheet element in this embodiment converts the elementary pattern in mirror image relationship. As shown in FIG. 15b the sheet 240 composed of optical fibre 250, 251, 252 . . . is folded at chain line xx. Such sheet elements 240, 241, 242 . . . and illumination sheet 243 . . . are alternately laminated together to form the sheet assembly as shown in FIG. 13a. The mother copy 201 is transmitted to the photosensitive paper 203 with correct relation on the photosensitive surface. The folded part xx may produce a thick part in the sheet and this part may conveniently be utilized for the insertion of the illumination sheets 243, . . . between them. The folded part xx may preferably have larger radius of curvature than about one hundred multiple of the diameter of the elementary fiber in order to avoid the light transmission loss and the leakage or cross talk.

Figure 16A:
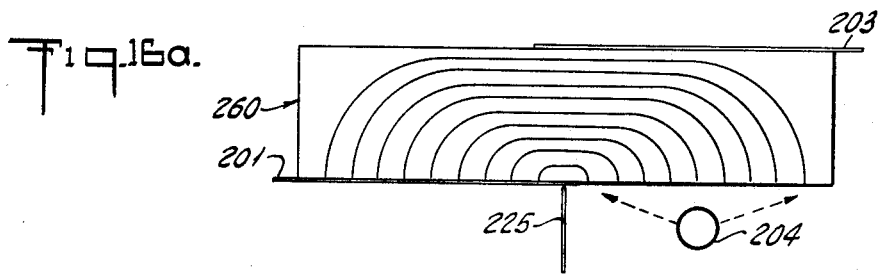
FIG. 16 shows another example of the duplicator according to the invention and the optical sheets employed therein in rough sketch (a), (b) and (c).
Figure 16B:
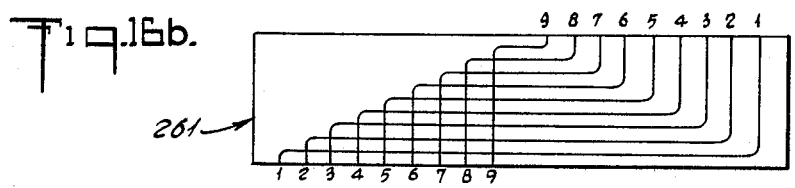
Figure 16C:
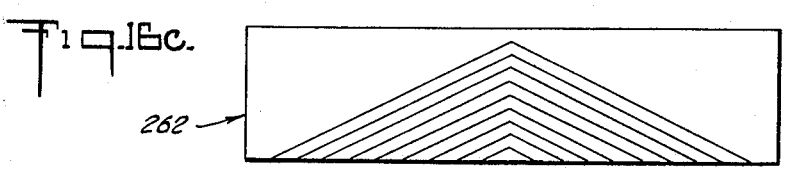

In FIG. 16a another form of duplicator is schematically shown. The pattern transmission sheet 261 and light transmission sheet 262 are shown respectively in FIGS. 24b and c. The sheet assembly 260 is produced by the lamination of these two sheets alternately. As shown in FIG. 16b the elementary fibres are crossed and also translates the mother pattern 201 correctly to the duplicating paper 203. The sheet 261 may be used upside down alternately so as to reduce the thickness of the sheet assembly.

Figure 17:
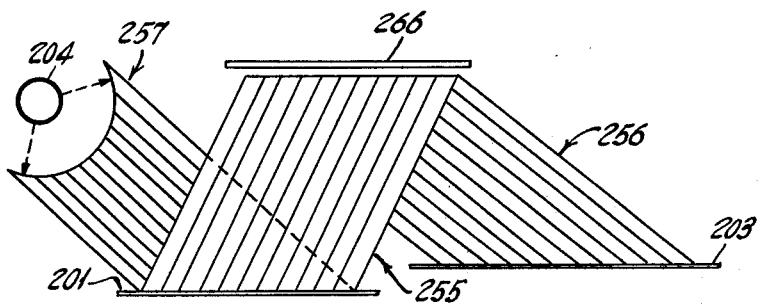
FIG. 17 shows another example of the duplicator according to the invention.

In FIG. 17 the image produced on the optical sheet as shown in FIG. 14 is inverted in its sense by the reflecting mirror 266 and again picked up by the optical sheet 256 so as to expose the photosensitive paper 203. 203 receives correct pattern as before. Between the mirror and the upper end surface of sheet assembly 255 some clearance may be provided or they may be placed with greater spaced relationship.

Figure 18:
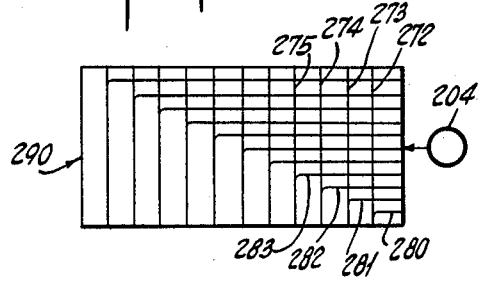
FIG. 18 shows another example of the optical sheet according to the invention.

The sheet assembly may be constructed as shown in FIG. 18 in which optical fibre 272, 273, 274 . . . are branched by the way to branched fibre 280, 281, 282 . . . and provides for illuminating to form fibre assembly 290. In this case the pattern and sheet assembly may be closely contacted. Alternatively a bundle of fibre may be branched to form such a structure. Such a branched light guide provides a hybrid or nonreciprocal coupling of the light wave if the light source and the surface opposing the photosenstive paper are seen as the light energy source. Instead of the branched guide two fibres may be arranged parallel each other. In such a situation the apparatus shown in the preceeding drawings may also be looked as the thybrid optical circuit. For example, in FIG. 4 the light source may be placed at each of the surface opposing the picture tubes. There is no coupling between the sources and the incident light to the surface 16 (viewing surface) is separated to three branches opposing to the tubes.

Figure 19:
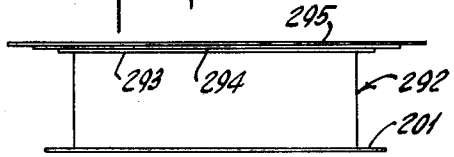
FIG. 19 shows still another example of the duplicator according to the invention.

As the photosensitive paper we may utilize the static charge storage paper as is used for "Xerography." In this case the upper surface of the fibre assembly 292 in FIG. 19 opposes the photosensitive paper 295 via thin film 294 of photoconductive material such as CdS and conductive film 293 such as Nesa glass.

If film 293 is grounded the charge previously charged to the photosensitive paper 295 discharges in accordance with the luminosity of the mother pattern as transmitted by the fibre assembly. Thus charge pattern is formed corresponding to the mother pattern. This charge pattern is developed by the known technique such as the power method.

If the fibre with conductive nature is employed the film 293 may be omitted.

Such a static charge storage paper may be of simple construction such as a paper with plastic film attached and far cheaper than that for so-called Xerography. For transparent pattern to be duplicated such a static exposing means may be utilized by means of such as the fibre assembly as described above.

The development of such a charge pattern can be performed by the adhesion of fine particles by the static force or, after thermal process, by the observation of the distorted pattern by the Schlieren method produced on the film while it is hot by the static force as in the case of the thermoplastic recording technique.

The apparatus as described above may also be useful for the illumination of the fibre scope applied for the observation of the object which can be illuminated by above means.

In FIG. 37 there is shown an optical sheet equipment for pattern dissolution or for observation of a single pattern from two observers. The numeral 621 shows e.g. a page of the book and it is transmitted to the direction A via the sheet assembly 622 and to the direction B via the sheet assembly B. Either one direction or both of them may be the photosensitive paper.

In order to illuminate the pattern 621 the illumination sheet 624 may be inserted at proper space. For such purpose the sheet 624 may be a simple glass plate provided with shading means for preventing the light to enter into A or B as described before. The sheet 624 transmits the light from the source 625. Between the sheet assembly and the pattern there may be some clearance if desired for improving the effect of the illumination.

Figure 38:
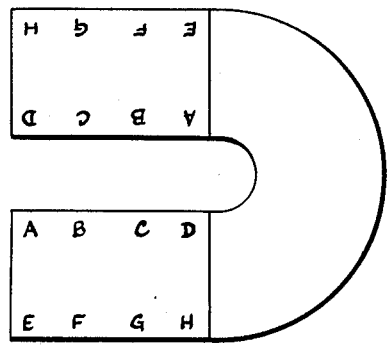
FIG. 38 shows an optical sheet assembly employed in the present invention.

FIG. 38 shows a modification of the equipment of FIG. 37. The sheet assembly is bent so as to enable two opposed men to observe the same pattern.

Figure 20A:
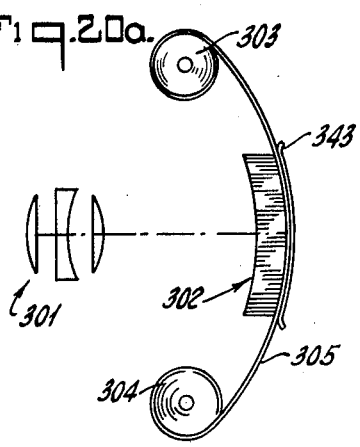
FIG. 20 shows an example of the photographic apparatus according to the invention in elevation (a), sideview (b) and the optical sheets employed therein ((c), (d) and (e)).

FIG. 20a show an optical camera system schematically in which 301 shows the lense system composed e.g. of three lenses and 305 is the photosensitive film of well known type. Numerals 303 and 304 indicates the supply and takeup reels respectively.

On the focal plane of the lense system there is mounted an optical fibre assembly 302 having the axis of the fibre nearly parallel to the direction of light. The left hand face of the fibre assembly 302 is made flat or properly curved so as to compensate the spherical or other aberration of the lense system. On the other hand the face of the optical fibre assembly is made flat or properly curved so as to accommodate it to the surface of the film. Employing this structure it is possible to focus very precisely because undue distortion of the film surface is avoided by the pressure of the fibre assembly onto the film surface. The fibre assembly may be moved toward and from the lense system with the backing plate 343 (not always necessary) thus adjusting the focus for the desired object.

In such focal plane adjusting system heretofore developed there was the possibility of distorting the film surface.

Employing the fibre assembly as described above such possibility is fully avoided and sharp focusing may be possible.

Such focusing structure has the merit of the ease in constructing the link mechanism to the distant measuring equipment.

The optical fibre used in this structure should be as thin as possible so as to make the resolution good so long as the dispersion by the wavelength of the light compromises.

The direction of the optical fibre element may preferably be parallel to the direction of the incident light at the left hand and perpendicular to the film surface.

Figure 20B:
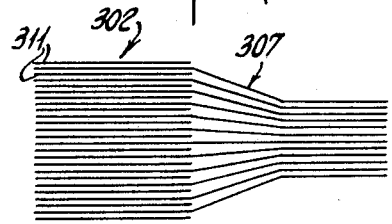
Figure 20D:
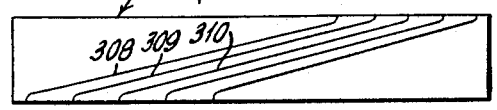
Figure 20C:
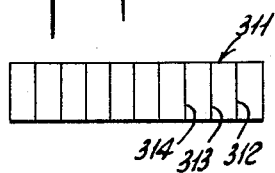
Figure 20E:
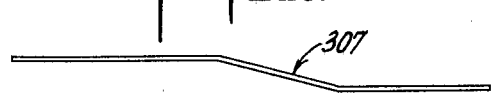

Such a fibre assembly may be easily constructed by the lamination of the optical fibre sheet 311 in FIG. 20c described above.

Further if another sheet element as shown in FIGS. 20d and e in plan and elevation respectively is inserted every several sheets of 311 as shown in FIG. 20b which is shown in the figure as numerals 6 and 7 there can be provided an optical finder of the camera system. This finder can be utilized as the reflex camera having rotating mirror system and may be used for focusing and decision of the frame of the picture. The finder can be used without the interruption of the function during shuttering. The dimension and shape of the finder can be made arbitrarily. For the sake of avoiding the possible leakage of the light from the finder system to the film the side faces of the inserted sheet 311 may be made black or other means may be provided in order to avoid any stray light may enter into the camera and reflect at the lense surface to expose the film e.g. by means of covering the eyepiece of the finder properly. Also making the direction of the optical fibre oblique to the lense axis may be effective to scatter the reflected light from the fibre of the finder system.

The focal plane shutter may be mounted to the fibre assembly adequately.

In FIG. 21a the optical image is produced by the lenses 315 and 316 on the facal plane 317 and 318. These images are synthesized by the interdigitally laminated optical sheet assembly 319 as described above. The synthesized image presented at the surface 319 is transferred to the film.

FIG. 21b shows the side view of the sheet assembly in which sheets 320, 322, . . . and 321, 323, . . . correspond respectively to the lense 315 and 316. Such a camera system has the merit of small F number and deep focus density, that is the range of focusing is wider than the usual lense system having the same F number.

In FIG. 22 same principle is applied to four lense systems in which two images are synthesized by the said procedure as 325 and 326 in FIG. 22b and further two images synthesized as above are again synthesized. Of course it is possible to gather all four images at once by the same technique.

FIG. 23 shows an example of the stereo-optical viewer according to the invention. The stereographic photograph is taken by means of two lense systems 317 and 318 and via alternately laminated optical sheet assemblies 317 and 318 there are produced two groups of patterns composed of lines 320, 322, . . . and 321, 323, . . . shown in FIG. 23b. Such photograph is viewed by the laminations of the optical sheet as shown in FIG. 323d composed of two kinds of sheets 30 and 31 having optical fibre element inclined oppositely such as 332, 333, 334, . . . and 337, 336, . . . respectively. FIG. 23c shows the combined sheet shown in FIG. 323d which is viewed from eyes 340. The optical sheet assembly should of course be adjusted by its position so that corresponding pattern such as composed of 320, 322 may coincide with corresponding sheet elements such as fibre elements 333, 334, . . . . Optical sheet assembly may be made as to directly attach to eyes branching to two branches.

FIG. 24a shows a pattern dissolving into substantially linear pattern composed of lines 402', 403', 404' . . . which correspond to elementary lines 402, 403, 404 . . . of the original pattern. FIG. 24b shows the elevation of FIG. 24a. Such dissolving is performed by means of optical sheet 405 and 404 as shown in FIG. 24 c and d respectively comprising optical fibre 410, 411, 412 . . . and 415, 416, 417 . . . respectively.

In FIG. 25 the original pattern is dissolved to both sides as shown.

In FIG. 26 the dissolved lines are arranged in a line by suitably bending the sheet.

FIG. 27 shows the dissolving sheets arranged circularly in order to save the space.

The optical image is produced by the lense 460 on the lower surface of the sheet assembly 477 which is composed of a number of optical sheets 450, 451, 452 . . . that are curved properly so that their other ends conform with a cylindrical surface 510, said other ends being indicated by numerals 450', 451', 452'. . . .

FIG. 28b shows one procedure for making such sheet assembly in which the laminated sheet block 507 is deformed like the folding fan splitting into sheet ends 450, 451, 452. . . .

According to the present invention there is provided a record of the image of the moving object on a motion picture film or other tape form medium by means of above mentioned means as shown in FIG. 31, that is, the lineally split image is recorded across the tape the direction of which is not parallel to the direction of the transport of the film.

It should particularly be noted that the film does not need to be transported intermittently as in the case of the motion picture. Each line element of the pattern varies its intensity quite continuously as the original scene. The minimum transportation speed of the film is limited by the speed of the movement of the object in order to avoid the fall of the resolution. The speed of the film may be changed from time to time corresponding to the rapidness of the phenomena and the change is recorded e.g., on the film edge or other suitable place as the pilot signal so that the film speed on reproduction may be regulated in accordance with the recording speed. On reproduction the recorded pattern is again synthesized into two dimensional pattern by means of an apparatus such as used on recording.

The reproduced picture thus produced is quite continuous like as much as the original motion. Motion picture heretofore used has never such nature but it exhibits intermittent patterns relying on the afterimage of the human eye.

Television of course relies on the afterimage of the quickly moving spot. To the contrary the new motion picture system according to the present invention has the extraordinary nature of perfect continuity. We can observe the reproduced scene as natural as the original scene regarding to the continuity.

No unnatural jerk can be observed with quick moving object. No jerk can be observed if one waves hand before the reproduced picture. In return for this merit the system according to the invention has the demerit of the line structure of the reproduced image. However, this demerit is the same as the case of the television and can be avoided by increasing the number of sheet or by vibrating the image slightly perpendicular to the sheet.

The recording and reproducing system as described above has the further merit that there is no need of intermittent transmission of the film. The recording (shooting) and reproducing can be taken place smooth and noiseless with cheap machines having long life. The film is economized because no clearence during film driving is necessary.

The apparatus shown in FIG. 27 can easily be adapted to record on the film shown with 433 which is transported from left to right via a capstan or like means not shown. 461 and 462 show the guide rolls. Because the ends of the fibre sheets are arranged obliquely as shown the recorded locus becomes such as shown in FIG. 31 running obliquely to the film.

The reproduction of the picture which is recorded as above described may be performed by the same or similar apparatus for recording or picking up, the path of light being reversed.

The reproduction can be taken place with an arbitrary speed to produce quick, slow or still motion.

If the image to be taken is the video picture one oblique track corresponds to one field and if the speed of the film and the inclination of the tracks are properly selected adjacent track having similar information can be made to oppose together. The film edge automatically corresponds to vertical blanking. With such arrangement and by the proper choice of the width of the recorded tracks in the case of the reproduction by the "interpolation effect" the reproducing sheet assembly may be stopped at any place and may be reproduced with arbitrary speed without flicker as in the case of the natural scene described above.

Such a record may be hereinafter referred as "registered tracks." Above case corresponds to that in which the direction of the optical sheet is nearly parallel to the direction of the horizontal lines. If these directions are perpendicular to each other a shutter should be used which opens at every end of the vertical scanning in order to obtain the track as shown as 440, 441, 442 . . . in FIG. 29. If this is not the case the track will become such as shown as 440', 441' . . . and it may be difficult to register the tracks as described above.

If the image to be picked up is the motion picture the recorded tracks 440, 441, 442 . . . can be produced at every picture and it is also possible to register the tracks by the proper choice of the film speed and the track inclination. From such record an arbitrary framed motion picture or video pickup can be made.

For such purpose of conversion of the repeating frequency an endless film can be used.

FIG. 30 shows a schematic of the apparatus which is capacable of recording onto a tape form medium having special construction according to the invention. The optical sheet assembly 467 as shown in FIGS. 24, 25 or 26 is attached to the tape with the recording end 470 being obliquely arranged to the direction of the tape transportation. On the surface of 470 there is provided a transparent conductive layer 466 such as the Nesa glass and transparent (favorably) photoconductive layer 465 such as CdS. The tape 433 may be made with high insulation plastic material or such material as the Electret. The tape is charged by a high tension before recording via the electrode 472. On recording this charge is discharged according to the intensity of the light fed from the sheet assembly and there is produced a charge pattern on the tape the quantity of which corresponds to the intensity of the light. The Nesa glass may be grounded properly.

If the glass fibre having conductive nature for the electricity the layer of Nesa is not necessary. Such fibre may be metallized glass fibre. The charge pattern thus produced can be used to make distortion on the tape by heating with the heater 468. Otherwise if the material such as the Electret is used the tape is heated during scanning and after cooling the charge is fixed. Other fixing means may be the adhesion of small particles as in the case of xerography.

In the case of utilizing the apparatus as shown in FIG. 27 the procedure is the same.

There may be another known technique which converts the light to the recorded pattern.

FIG. 32 shows an example of the apparatus for reproduction of the image from the record as described above. From the record via cinefilm, thermoplastic film or xerographic film it is possible to reproduce optically by the known art. The light source 478 illuminates the film on the sheet ends such as 450', 451', . . . in FIG. 27 and produces synthesized pattern on the plane 401 of the sheet assembly 477. The reproduced pattern can be directly observed or projected via lense system 460 to the screen. The light source may be circular phosphorescent lamp attached with circular light concentrator. If the record is electrostatic it is possible to reproduce optically by adhering fine particles as described above or it can be scanned electrostatically by scanning head. Alternatively such a record can be reproduced by a magnetic head assembly after adhering magnetic particle thereon.

FIG. 33 shows the case in which the inner surface of a drum is the recording medium. The optical sheet assembly may be such as shown in FIG. 27. By transporting the drum relative to the sheet assembly the optical pattern can be continuously recorded or reproduced as in the case of the magnetic drum. For optical reproducing the light source such as shown in FIG. 32 may be used. In this case for the arbitrary speed of the drum the adjacent record corresponds to the same height of the picture. The light path may be either through aperture 483 of the drum or via reflector 481 to or from screen or pattern 479.

The apparatus according to the present invention can be applied to the color image treatment. For example three color filters as shown in FIG. 34a corresponding to red (R), green (G) and blue (B) arranged in stripes may be used with the pattern. The end part 402', 403', . . . in FIG. 24 may correspond to R, G and B respectively thus yielding line sequential color recording system. On reproduction similar filter may be used. The filter may be such as shown in FIG. 34b having dot-sequential color selecting property.

The color system according to the invention has the merit of easier color registration because there is no head scanning necessitating only the tape transportation.

If the recording part of the tape or film is divided into three portions 504, 505 and 506 as shown in FIG. 35 and recorded with the stacked apparatus having three elements with proper filters of such as that shown in FIG. 27 three color images are separately recorded. The focussing of the pattern may be made either separately via three lense systems or rather simultaneously via pattern resolver utilizing optical sheets as shown in FIGS. 4 or 11. Such a sheet assembly is capable of resolving the pattern or the scene into three equal patterns or synthesizing three patterns reproduced into a single color pattern as described above. The same sheet assembly can be utilized for recording and reproduction. The difficulty of color registration becomes very slight with this arrangement.

The color filter may be saved by utilizing colored fibre.

The transformed pattern of the two dimensional pattern into one dimensional pattern may not necessarily be linear, but it may be such as shown in FIG. 29 with 440', 441, . . . thus reducing the dimension of the sheet assembly. Furthermore the apparatus shown in FIG. 27 may be stacked in the axial (of the cylinder) direction thus reducing the number of the sheet therefor reducing the diameter of the sheet assembly because a frame of the picture is divided into several parts each corresponding to one sheet assembly. The record may not be confined to optical. For example magnetic pattern may be reproduced by a known pick up head responding to the static field without scanning.

In the next section the method of the fabrication of the optical sheet assembly according to the invention will be described. Because of the special use of the optical fibre the method may be particular compared to the prior art.

Generally the sheet may be produced by weaving the optical fibre cloth having warp and woof with optical fibre and wire respectively as shown in FIG. 2. This cloth is distorted to a proper shape such as is shown in FIG. 5a. The optical fibre thread may be drawn out in a linearly arranged manner from discs or extruder containing melted optical glass. The material may be transparent plastics such as the polyvinyl chloride, polyethylene, acryl or polystyrol or urea or allyl-glycol carbonate preferably increased the transparency by the radioactive treatment. Such material may be easily pressed or molded so as to shape the required optical sheet. Roller etched with proper slotts may be used to make such sheets continuously and quickly. Even the softened glass by heat may be worked by such technique as pressing or molding. Especially in the case of the application to the television receiver etc. in which the fibre element have rather large diameter such procedure may be accessible.

Also the powdered glass knead with appropriate liquid may be extruded from the dice arranged parallel on the wall of container, then it is heated around the melting point or sintered and heat treated so as to eliminate the strain in the glass. Such a mixture of the powdered glass and kneading liquid may be pressed or rolled as before and then heat treated to form the required sheet. Also the technique of photoetching, electron beam etching, laser etching and supersonic etching etc. may be utilized too the glass, plastics or metals to form thin slots.

After the sheet is pressed or molded and forms comb like structure the part corresponding to the base of the comb may be clipped out to fully or almost fully separate the individual optical guide part if necessary in order to decrease the crosstalk between the adjacent guides.

Otherwise said base part may be varied in its composition by suitable heating with or without adding an appropriate material so as to decrease the refraction constant of that part or to absorb the spurious light.

Among the type of the optical sheet the type having oblique fibre direction may have difficulty to manufacture.

Figure 39:
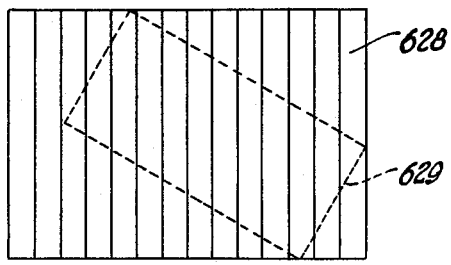
FIG. 39 shows another method of fabrication of the optical sheet.

FIG. 39 shows one of the methods. The original sheet 628 is the ordinary sheet having straight fibres. This sheet is cut along the dotted line 29 and forms the optical sheet as shown in FIG. 5a.

Figure 40A:
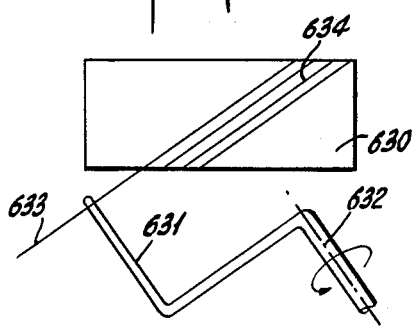
FIG. 40 shows an example of the fabricating apparatus of the optical sheet as shown in FIG. 4.
Figure 40B:
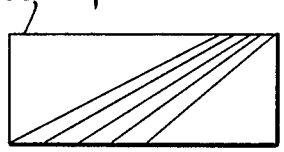

FIG. 40 shows another method. The fibre element 633 is wound around a rectangular frame 630 the rotating axis 632 of the winder being oblique to the frame. 631 is the wire guide. If, during the rotation of the axis 632 the direction of which is varied or the guide 631 is moved as the honeycomb coil winder, it may be possible to make the edge part of the fibre wound on the frame to substantially intercept with right angle to the edge portion of the frame so as to form such sheet as shown in FIG. 4. For increasing the light transmission efficiency such form is desirable. Also the sheet as shown in FIG. 40b may be produced by the proper movement of the shaft 632 or frame 630.

Figure 41:
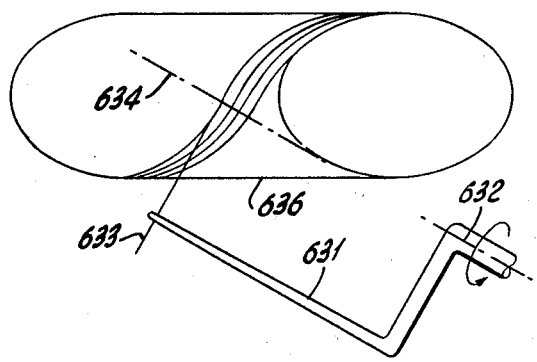
FIG. 41 shows a method for the fabrication of the optical sheet according to the invention.
Figure 42:
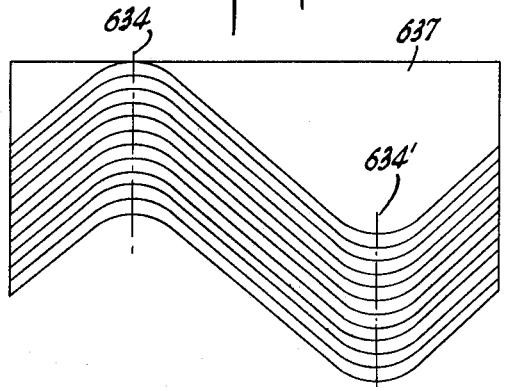
FIG. 42 shows the fabrication procedure of the optical sheet according to the invention.

FIG. 41 shows a novel method for the fabrication of the sheet as shown in FIG. 4. The optical fibre 633 is wound around an elliptical frame 636 having its axis oblique to the axis 632 of winding. The fibre wound up is, after fixing by proper paste, if necessary, cut along the chain line 634 and is expanded to form the sheet as shown with 637 in FIG. 42. Cutting this sheet at chain lines 634 and 634 will yield the required sheet.

Figure 43:
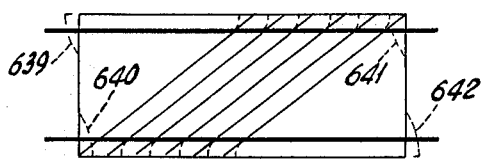
FIG. 43 shows still another method having similar object as that shown in FIG. 42.

FIG. 43 shows another method in which the fibre is wound around a plastic sheet straightly and obliquely as shown with real lines or the fibre is fixed by plastics after being drawn out of the winding frame. Thereafter both edges of the sheet is deformed e.g. by heating or by the function of a chemical material so as to form the shape as shown by the dotted lines. 641 and 642 show the heating wires.

Figure 44:
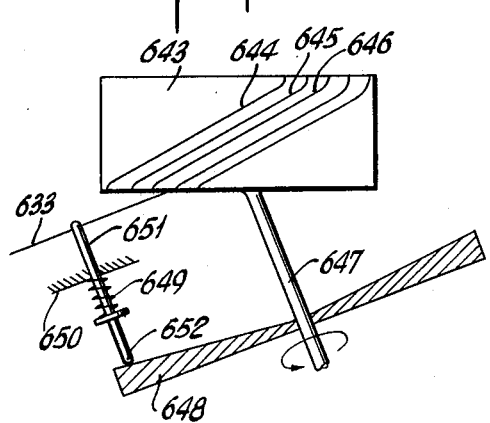
FIG. 44 shows still another fabricating procedure of the optical sheet according to the invention.

FIG. 44 shows another method for the production of the optical sheet as described above briefly. The frame 643 is rotated around the axis 647 to which a cam 648 is attached. The optical fibre 633 is guided via guide 651 the other end of which forms the cam follower part 652. The fibre oscillates while it is wound and forms the required fibre arrangement 644, 645, 646, . . . as shown such that the edge part of the fibre crosses the edge nearly perpendicularly. The spring 649 drives the cam follower with the fixed end 650. Other means may be used to oscillate the guide.

Figure 45A:
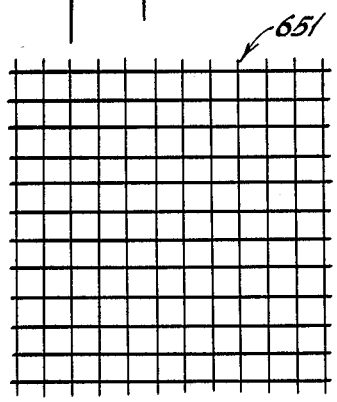
FIG. 45 shows another procedure for the fabrication of the optical sheet according to the invention.
Figure 45B:
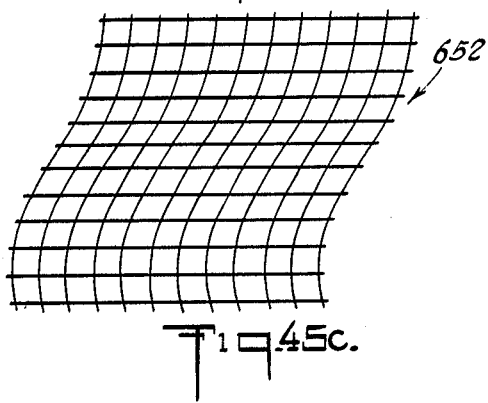
Figure 45C:
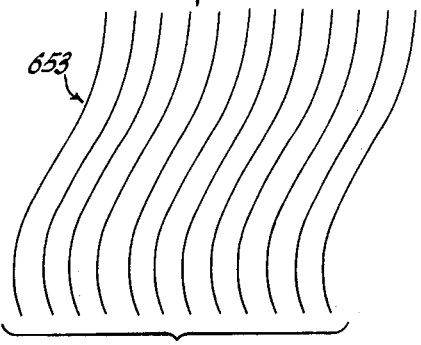

FIG. 45 shows another method which also touched above. The optical fibre is woven as the warp and soft thread such as plastic preferably having low refraction coefficient is woven as the woof as shown in FIG. 45a. This mesh is deformed such as shown in FIG. 45b. Employing soft material as the woof and by the proper weaving means the warp may be substantially straight. Furthermore, if the woof is removed by e.g. proper solvent or heat. The optical sheet as shown in FIG. 45c is obtained after fixing by an adequate cement. If the woof is removed leaving a part thereof it may be used as the cement.

Figure 46:
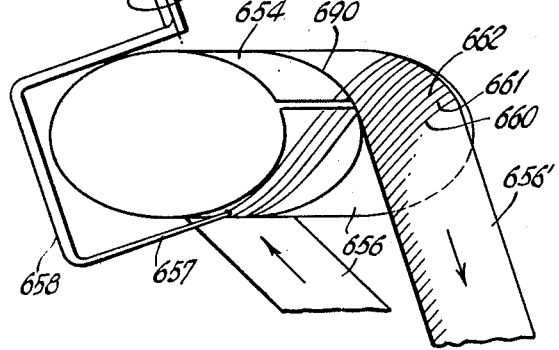
FIG. 46 shows another fabricating procedure of the optical sheet.

In FIG. 46 a plastic or other tape 656 is guided via the gap 690 of the elliptical guide 654 and wound around it more than one turn and pulled to the direction shown by the arrow. A rotating needle 657 having rotating axis 659 cuts the tape and yields parallel slots shown as 660, 661, 662, . . . on the tape 656' coming out of the guide. The tape is then cut at proper place and laminated as described. The rotating needle may be rotated within the elliptical guide in which case the guide is split at the centre. Instead of the needle the fibre may be wound and out where the tape goes out of the guide. Otherwise the needle may be substituted by a pen writing with ink of powdered glass described above, and the tape may be of copper so as to enable the heat treatment afterwards. Furthermore, the needle provides the electric charge on the plastic tape and after thermal treatment the deformation is formed to utilize as the optical fibres. Otherwise, glass or plastic powder is adhered to the tape and afterwards heat treated. Other recording and fixing method such as used in the oblique recording VTR can be applied.

Figure 47:
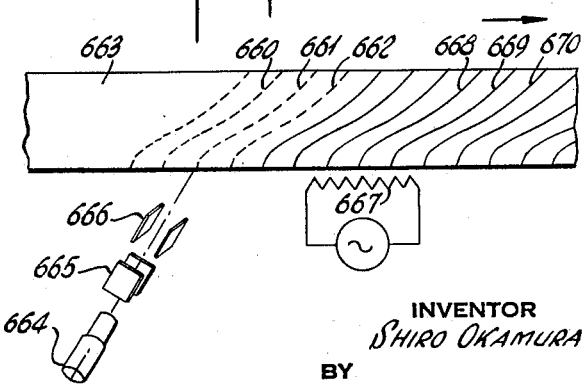
FIG. 47 shows another manufacturing method of the optical sheet.

FIG. 47 shows still another method utilizing the thermoplastic procedure as above. The plastic tape 663 is charged by the electron beam from the electron gun scanned by the deflection plates 665 and 666 so as to form the pattern shown as 660, 661, 662, . . . . Thereafter the tape is heat treated by the heater 667 and forms the slots 668, 669, 670, . . . . Otherwise, glass or plastic powder may be adhered to the charged parts and afterwards heat treated.

In FIG. 48 the pattern having large dimension is projected by the lens system 672 to the sheet or tape 673 having photosensitive surface resulting small sized image of the pattern. By the photoetching process the required patterned optical sheet is obtained.

In FIG. 49 the metallic wires 675, 676, 677, . . . arranged on the base plate 678 are sharpened by the chemical or electrolytic etching (a') and laminated as follows. FIG. 49b shows the plan. Into the slots thus formed may be injected the melted glass or plastics.

FIG. 50 shows another form of the optical sheet in which the sheet 680 contains circular arc form fibre 653 etc. The pattern 621 may be transferred to A or B direction by the lamination of the sheet 654 alternately. The sheet 680 may be made by slicing the cylindrically wound optically transparent blank sheet having low refraction material on its surface the cross section of which is shown in FIG. 51a. Alternately the optical fibre 682 is wound around the conical frame 681 shown in FIG. 51b and afterwards cut properly. The cone may be pressed to become flat as shown in FIG. 51b' with numeral 683.

FIG. 52 shows the roller pressing or molding the blank sheet composed of plastics or softened glass e.g. by heat producing the required pattern as shown in FIG. 4b. This product may have base part as shown in FIG. 53a with 689. This base part may be clipped at line x—x preferably after fixing the other face with proper low refraction material shown with 690.

Alternately, as shown in FIG. 53b, the synthesized sheet composed of light conductive film 710 and another film 711 composed of the material having lower refraction index may be pressed, molded or cut to form the part 712 as to leave the part composed of 711. The part composed of 710 may be allowed to leave in some cases as shown by 713 which may have some leakage of light. The material may also be powdered paste of glass or plastics. Also, the plastic or liquid state material may be molded or pressed by a proper mother type and after or during hardening a film having lower refraction index may be attached thereto. The hardening may be taken place by cooling or chemical reaction.

FIG. 54 shows the melted glass or plastics 691 in the melting pot 692 is extruded out of the lower wall and bent properly by the guides 694 and 695 on the sheet base and through guides 699 and 700. The fibres drawn out are cut sheet by sheet.

The content of the pot 692 may also be the powdered glass with kneading liquid and afterwards the sheet may be heat treated to sinter or melt into glass fibre. Such powdered glass technique may be applied to other processes. For example, the raw sheet 686 in FIG. 52 may be metallic sheet coated with such material and afterwards it is heat treated.

FIG. 55 shows a method of producing the sheet used for the application as shown in FIG. 24a. The fibre bundle 696 as shown in FIG. 55a is cut via a plane a—a thus producing the block 697 shown in FIG. 55b. Thereafter, this block is sliced by the vertical plane passing b—b, thus yielding the sheet as shown in FIG. 24a.

FIG. 56 shows the optical sheet sliced from the lamination of the optical films 702 (FIG. 56a), thus yielding the sheet 701 (FIG. 56b).

What is claimed is:

1. A camera for optically recording a moving object comprising means defining a cylinder,
means for producing an image of the object in an image plane,
means selecting predetermined discrete optical portions of the image for rearranging the optical portions adjacent one another along a line, said rearranging means including a bundle of laminated layers of optical fibers arranged to terminate at one end in a two dimensional surface in the image plane and arranged to radiate outwardly in a fan-like array from the image plane to terminate on the inner side of said cylinder, the fibers of each layer being positioned at said inner cylindrical surface to terminate adjacent one another in linear array, the ends of said layers being angularly distributed over the inner surface of said cylinder,
means for continuously moving a continuous optical recording medium having a light sensitive and image containing surface over the cylinder in a circular direction with the light sensitive surface facing radially inwardly adjacent the laminated fibers for exposure therebetween.

References Cited

UNITED STATES PATENTS

| | | | |
|---|---|---|---|
| 2,506,672 | 5/1950 | Kell et al. | 350—96 X |
| 3,043,179 | 7/1962 | Dunn | 350—96 |
| 3,125,013 | 3/1964 | Herrick et al. | 350—96 X |
| 3,141,105 | 7/1964 | Courtney-Pratt | 350—96 X |
| 3,247,755 | 4/1966 | Siegmund | 350—96 |
| 3,254,557 | 6/1966 | Brake et al. | 88—1 |
| 3,294,903 | 12/1966 | Goldmark et al. | 88—1 X |
| 3,323,407 | 6/1967 | Gamba | 350—96 X |

FOREIGN PATENTS 780,976  8/1957  Great Britain.

JOHN K. CORBIN, Primary Examiner

U.S. Cl. X.R.

156—174; 178—7.85; 350—96